Feb. 8, 1938.    H. KÜPPENBENDER    2,107,829
PHOTOGRAPHIC CAMERA
Filed Feb. 8, 1934    2 Sheets-Sheet 2

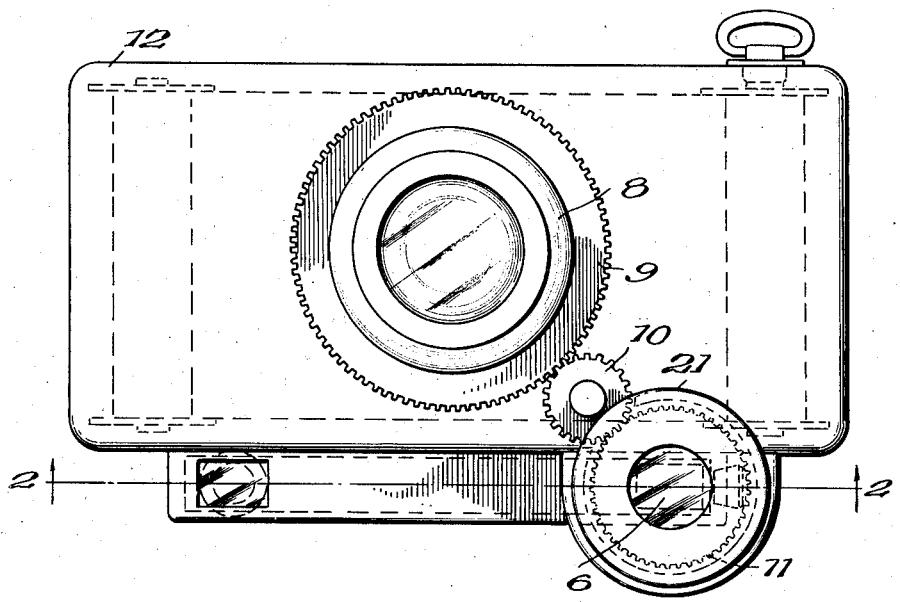
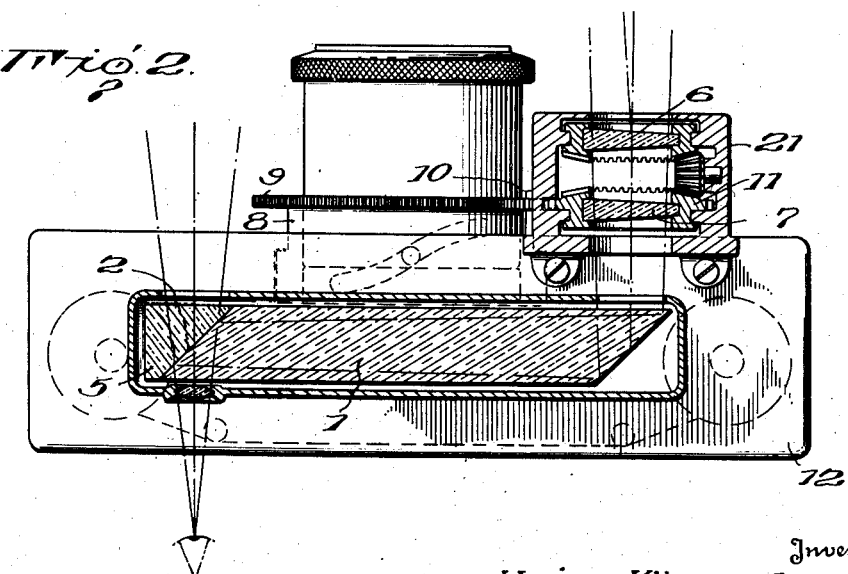

Inventor
Heinz Küppenbender,
By Karl Michaelis
Attorney

Patented Feb. 8, 1938

2,107,829

UNITED STATES PATENT OFFICE 2,107,829

PHOTOGRAPHIC CAMERA

Heinz Küppenbender, Dresden, Germany, assignor to Zeiss Ikon Aktiengesellschaft Dresden, Dresden, Germany Application February 8, 1934, Serial No. 710,208
In Germany February 18, 1933

9 Claims. (Cl. 95—44)

This invention relates to photographic cameras and more especially to the combination, with such a camera, of a telemeter which is coupled with the means for adjusting the objective. Hitherto, mirror or prism systems have been employed for deflecting the measuring rays, the systems being turnable on an axis lying perpendicularly with respect to the measuring plane. There are also known telemeters in which lens systems can be shifted relatively to one another and parallel to the basis. All these devices involve the drawback that the means for transmitting power for turning the systems must be constructed for very exact operation. If the measuring rays are being deflected by rotatory mirrors or prisms, the rotary motion must be produced with the twofold accuracy, that is to say, with one half of the allowance admitted for the measuring ray. The same accuracy must be observed as regards the adjustment of the distance, and likewise as regards the equalization of differences of height. Similar difficulties are encountered if lens systems are to be shifted according to the above-mentioned procedure.

In order to obviate the several difficulties and drawbacks, the photographic camera according to the present invention, is combined with a telemeter which is coupled with the means for adjusting the objective, said distance meter being designed in a manner known per se as a basis telemeter with stationary reflecting surfaces (prisms), in which the deflection of the measuring rays is effected by two glass wedges which are turnable relatively to one another. The dimensions of said wedges should be such that when they are moved, the rays are deflected only in one direction (in the measuring plane), whereas the wedge deflections in all other planes compensate one another. Actuation of the measuring wedges may be effected in a variety of manners. I prefer moving the wedges by means of the worm of the objective, or, if the objective is provided with an adjustable front lens, to operate the wedges from this place.

Figure 3:
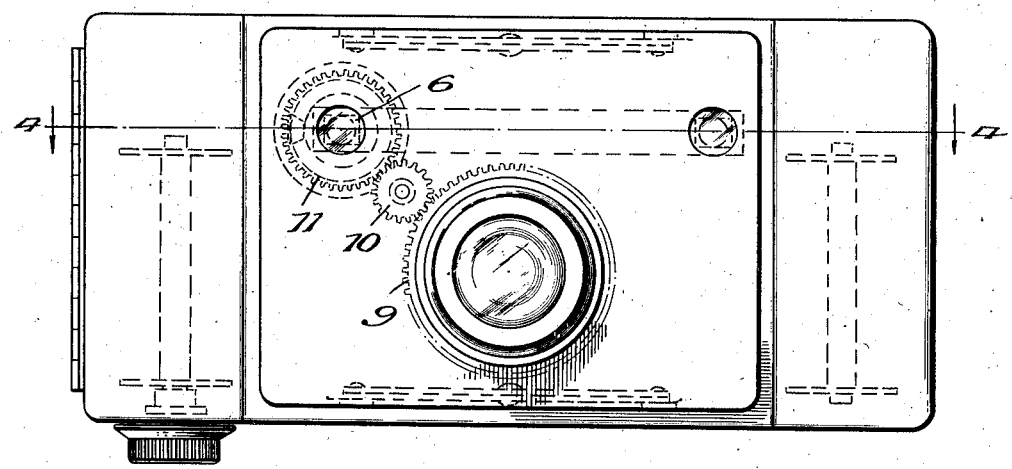
Figure 4:
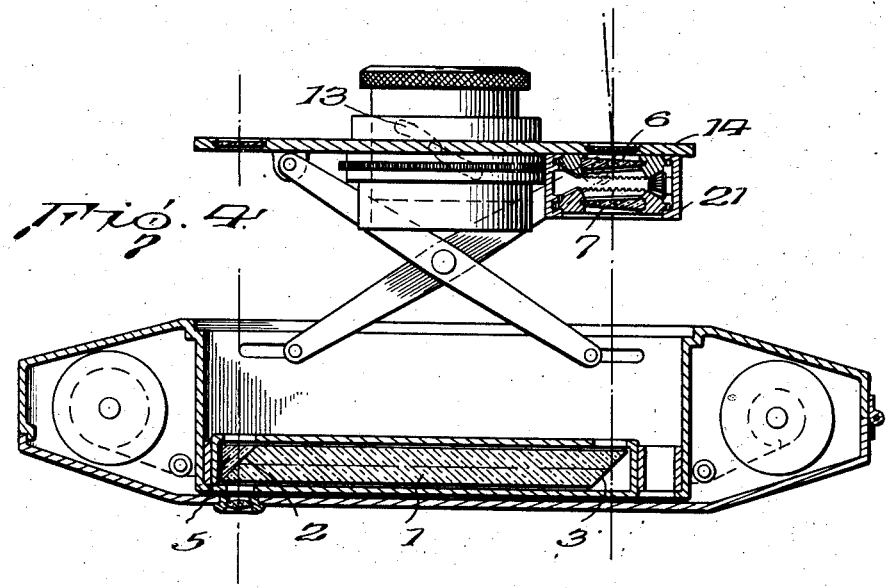

The invention is illustrated diagrammatically and by way of example in the accompanying drawings on which Figure 1 is a front view and Figure 2 a plan view, partly in horizontal section, of a closed casing camera, Figures 3 and 4 are similar representations of a bellows camera. In all figures similar parts are marked with the same reference numerals. In both constructional forms the basis telemeter consists of a rhombic prism 1, the surface 2 of which is semipermeably gilded, while the other, reflecting surface 3 is fully silvered. The silvering of the surface 3 can be obviated, if this surface is totally reflecting. By the use of various metallic layers one can obtain that the picture sighted through the prism appears in a color differing from that of the picture made visible in the reflection.

The prism 1 is arranged upon one of the narrow sides of the camera body. To the semitransparent surface is cemented a simple angular prism 5 in order to render a direct vista possible. If the two reflecting surfaces are located parallel to one another, objects not infinitely remote are being seen twofold owing to the finite basis of the telemeter. In order to make the two objects coincide, one of the measuring rays is deflected. This is effected, according to this invention, by two glass wedges 6 and 7 which are arranged in a definite position relatively to one another in mounting 21. The wedges are driven, in the constructional form shown by way of example in Figs. 1 and 2, from the mounting 8 of the objective adjusting member, which may be provided with a worm thread or a cam groove, through cog-wheels 9, 10 and 11. If such glass wedges are turned counter to one another, the measuring ray is deflected only in one direction because the deflection at right angles thereto is compensated owing to the opposite rotation of the measuring wedges. If now the plane of the deflection of the measuring ray is shifted into the plane of the measuring triangle by an appropriate adjustment of the wedges, the above-described system consisting of the rhombic prism and the measuring wedge constitutes an optical telemeter.

The advantage presented by the combination of a camera with such a telemeter is that the rotation of the deflecting member takes place no longer in the plane of the measuring triangle, but at right angles thereto. With such a measuring device it is no longer necessary to move the measuring elements with the exactness hitherto requisite. This will be obvious at once if the circumstance is considered that for a deflection of the measuring ray from infinity to 1 m. an angular movement of the ray of from 2 to 3 degrees for the usual basis lengths is necessary, whereas for the same movement of the measuring ray rotation of the wedges through an angle of about 180° can be effected.

Arithmetical investigations have shown that the admissible allowances with such a system can be about 100 times larger than, for instance, with the system of ray deflection by reflecting surfaces. It will be obvious that such a telemeter cannot only be manufactured at lower costs, but that also its resistance to exterior strain and deformations is by far greater.

In view of the particularity of the distance meter forming the subject-matter of this invention, the requirements to be hitherto fulfilled need no longer be observed; the ray deflecting means or members (wedges) can now be attached to the front plate 14 of the objective as shown in Figs. 3 and 4 and this plate can be connected with the camera body and, thus, also with the rhombic prism by simple bottom stays or the like, whereby the coupling of the telemeter with the objective motion is extraordinarily simplified.

With other telemeters combined with the camera it was necessary to provide that the telemeter system as a whole be secured to a rigid supporting body in order to prevent such variations of the ray deflection as might arise in the course of time.

In the constructional form shown in Fig. 1 the measuring wedges are arranged directly on the camera casing 12. In the modification illustrated in Fig. 4 they are arranged on the objective carrier 14 of a bellows camera.

In order to bring the feed movement of the objective in proper accord with the movement of the measuring wedges for the purpose of fine adjustment, a correcting means is inserted between the objective motion and the turning wedges; such a means being formed, for instance, by a guide slot 13 (Fig. 4) formed, for instance, in the objective extension tube.

I wish it to be understood that I do not desire to be limited to the exact details of construction shown and described for obvious modifications will occur to a person skilled in the art.

I claim:

1. A camera provided with a focussing device in combination with a telemeter having the same view as said camera and adapted to bring into coincidence two images of said view projected along two spaced lines of vision, the said telemeter comprising optical means rotatable about an axis substantially coinciding with the axis of vision, for deflecting in a plane one of said images, mounted independently of the remaining elements of said telemeter in the path of one of said lines of vision and adapted to bring said image into coincidence with the other of said images, and means for coupling said optical means with said focussing device to be moved therewith and to bring said images into coincidence only when said camera is in focus.

2. The combination of claim 1 wherein the base line of said telemeter is defined by the distance between two optical elements mounted on the body of said camera.

3. The combination of claim 1 wherein said optical means for deflecting one of said images comprises two opposed optical wedges rotatable in opposite directions.

4. The combination of claim 1 wherein said optical means for deflecting one of said images is mounted on the body of said camera and comprises a pair of wedge shaped light refracting members angularly displaceable in opposite directions.

5. The combination of claim 1 wherein the camera focussing device comprises an objective lens with a rotatable mounting serving to focus said camera and wherein said optical means for deflecting one of said images comprises rotatable wedge members, said wedge members being coupled to said lens mounting for rotation therewith.

6. The combination of claim 1 wherein said telemeter comprises a rhomboid prism, the length of which defines the base line of said telemeter.

7. The combination of claim 1 wherein the camera is a bellows camera having a moveable objective carrier and said optical means for deflecting one of said images is mounted on said objective carrier.

8. The combination of claim 1 wherein said telemeter comprises stationary light reflecting means and two wedge shaped refracting members angularly displaceable in opposite directions and arranged in series with said reflecting means.

9. A camera provided with a focussing device in combination with a telemeter having the same view as said camera and adapted to bring into coincidence two images of said view projected along two spaced lines of vision, the said telemeter comprising two optical wedges, rotatable in opposite directions about an axis substantially coinciding with the axis of vision and mutually compensating except in one plane, mounted in the path of one of said lines of vision and adapted to deflect one of said images, said wedges being operatively coupled with said focussing device to bring said images into coincidence only when said camera is in focus.

HEINZ KÜPPENBENDER.